US010551996B2

(12) United States Patent
Chen et al.

(10) Patent No.: US 10,551,996 B2
(45) Date of Patent: Feb. 4, 2020

(54) METHOD AND APPARATUS FOR STARTING AN APPLICATION IN A SCREEN-LOCKED STATE

(71) Applicant: CHEETAH MOBILE INC., Beijing (CN)

(72) Inventors: Yong Chen, Beijing (CN); Shengsheng Huang, Beijing (CN); Mengxue Zhan, Beijing (CN); Yandan He, Beijing (CN)

(73) Assignee: CHEETAH MOBILE INC., Beijing (CN)

( * ) Notice: Subject to any disclaimer, the term of this patent is extended or adjusted under 35 U.S.C. 154(b) by 319 days.

(21) Appl. No.: 15/105,347

(22) PCT Filed: Aug. 15, 2014

(86) PCT No.: PCT/CN2014/084572
§ 371 (c)(1),
(2) Date: Jun. 16, 2016

(87) PCT Pub. No.: WO2015/120707
PCT Pub. Date: Aug. 20, 2015

(65) Prior Publication Data
US 2016/0349962 A1    Dec. 1, 2016

(30) Foreign Application Priority Data

Feb. 14, 2014 (CN) .......................... 2014 1 0052564

(51) Int. Cl.
*G06F 3/0481* (2013.01)
*G06F 3/0488* (2013.01)

(52) U.S. Cl.
CPC ........ *G06F 3/04817* (2013.01); *G06F 3/0488* (2013.01)

(58) Field of Classification Search
CPC ... G06F 3/04817; G06F 3/0488; G06F 3/0484
See application file for complete search history.

(56) References Cited

U.S. PATENT DOCUMENTS

| 5,313,578 A | * | 5/1994 | Handorf ................. G06F 9/546 |
| | | | 711/147 |
| 6,038,571 A | * | 3/2000 | Numajiri ............... G06F 3/0601 |
| (Continued) | | | |

FOREIGN PATENT DOCUMENTS

| CN | 102306095 A | 1/2012 |
| CN | 102880489 A | 1/2013 |
| (Continued) | | |

OTHER PUBLICATIONS

Translation of the International Search Report and Written Opinion corresponding to International Patent Application No. PCT/CN2014/084572, dated Nov. 19, 2014, 15 pages.

(Continued)

*Primary Examiner* — Amy Ng
*Assistant Examiner* — William Wong
(74) *Attorney, Agent, or Firm* — Lathrop Gage LLP

(57) ABSTRACT

A method and a device for starting an application under a screen-locked state, which are applied in an electronic device, said method comprising: detecting whether the electronic device is under the screen lock state; receiving a sliding operation instruction with respect to an icon of the application to be started; providing memory resources for starting the application to be started, if a sliding operation with respect to the icon of the application to be started satisfies a first predetermined condition; performing a screen unlocking operation and starting the application to be started, if the sliding operation with respect to the icon of the application to be started satisfies a second predetermined condition. With embodiments of the present disclosure, it is convenient for a user to start the application under the screen (Continued)

lock state, an efficiency of starting the application may be enhanced and an experience effect of the user may be improved.

14 Claims, 3 Drawing Sheets

(56) References Cited

U.S. PATENT DOCUMENTS

| | | | | |
|---|---|---|---|---|
| 6,412,021 | B1* | 6/2002 | Nguyen | G06F 9/44526 709/217 |
| 2003/0056076 | A1* | 3/2003 | Cook | G06F 9/5016 711/173 |
| 2004/0023646 | A1* | 2/2004 | Inami | G06F 9/4881 455/418 |
| 2004/0194089 | A1* | 9/2004 | McCarthy | G06F 9/5011 718/100 |
| 2005/0188163 | A1* | 8/2005 | Asthana | G06F 8/62 711/159 |
| 2007/0150826 | A1* | 6/2007 | Anzures | G06F 3/017 715/772 |
| 2007/0168724 | A1* | 7/2007 | Kohiga | G06F 9/4418 714/23 |
| 2008/0220752 | A1* | 9/2008 | Forstall | H04M 1/56 455/415 |
| 2009/0013157 | A1* | 1/2009 | Beaule | G06F 9/5016 712/225 |
| 2010/0257490 | A1* | 10/2010 | Lyon | G06F 3/0488 715/863 |
| 2010/0333043 | A1* | 12/2010 | Faris | G06F 3/04883 715/863 |
| 2012/0311499 | A1* | 12/2012 | Dellinger | H04N 5/23206 715/835 |
| 2013/0154960 | A1 | 6/2013 | You | |
| 2013/0191910 | A1* | 7/2013 | Dellinger | G06F 3/0488 726/19 |
| 2013/0346921 | A1* | 12/2013 | Shiplacoff | G06F 3/0488 715/835 |
| 2014/0289620 | A1* | 9/2014 | Xie | G06F 3/0488 715/702 |

FOREIGN PATENT DOCUMENTS

| | | |
|---|---|---|
| CN | 102929532 A | 2/2013 |
| CN | 103186332 A | 7/2013 |
| CN | 103488383 A | 1/2014 |
| CN | 103513861 A | 1/2014 |
| CN | 103761036 A | 4/2014 |
| CN | 103777871 A | 5/2014 |
| JP | 2013041512 A | 2/2013 |

OTHER PUBLICATIONS

Chinese Patent Application No. 201410052564.X, English translation of First Office Action dated Apr. 27, 2016, 7 pages.
Chinese Patent Application No. 201410052564.X, First Office Action dated Apr. 27, 2016, 7 pages.
Chinese Patent Application No. 201410052564.X, English Translation of Second Office Action dated Oct. 21, 2016, 11 pages.
Chinese Patent Application No. 201410052564.X, Second Office Action dated Oct. 21, 2016, 9 pages.

* cited by examiner

METHOD AND APPARATUS FOR STARTING AN APPLICATION IN A SCREEN-LOCKED STATE

CROSS REFERENCE TO RELATED APPLICATION

This application is a U.S. national phase application of International Application PCT/CN2014/084572, with an international filing date of Aug. 15, 2014, the entire contents of which are incorporated herein by reference.

FIELD

The present disclosure generally relates to an application processing technology field, and more particularly to a method and a device for starting an application under a screen lock state.

BACKGROUND

With the rapid development of electronic technologies, there are more and more users using electronic devices with touch screens. When the user uses the electronic device with the touch screen, he/she may operate within a corresponding region of the touch screen, so as to access applications installed in the electronic device quickly and conveniently. In the related art, the user may start an application by clicking an icon of the application on the touch screen, such that it is intuitive, quick and convenient to start the application. However, during usage, the application is often started by mistake due to a misclicking of the user. Based on this, the user generally starts the screen lock state to prevent starting the application by mistake. However, when the user wishes to start the application under the screen lock state, he/she may start the application only after unlocking the screen and entering a relevant interface. Thus, the screen lock state brings inconvenience to the user.

In addition, with the improvement of the hardware performance of the electronic device, the user may make multiple applications running simultaneously in the electronic device. However, this wastes a lot of memory resources, and when the user starts a certain application which requires many memory resources, phenomena such as low starting speed and unsmooth start will happen due to insufficient memory resources, thus affecting an experience effect of the user.

SUMMARY

Embodiments of the present disclosure provide a method and a device for starting an application under a screen lock state, which facilitates a user to start the application under the screen lock state, thus enhancing an efficiency of starting the application and improving an experience effect of the user.

Embodiments of the present disclosure provide a method for starting an application under a screen lock state, the method is applied in an electronic device, and the method includes:

detecting whether the electronic device is under the screen lock state;

receiving a sliding operation instruction with respect to an icon of the application to be started;

providing memory resources for starting the application to be started, if a sliding operation with respect to the icon of the application to be started satisfies a first predetermined condition;

performing a screen unlocking operation and starting the application to be started, if the sliding operation with respect to the icon of the application to be started satisfies a second predetermined condition.

Preferably, providing memory resources for starting the application to be started if a sliding operation with respect to the icon of the application to be started satisfies a first predetermined condition includes:

detecting whether a sliding distance of the icon of the application to be started in a predetermined direction is greater than a first predetermined threshold; and if yes, providing memory resources for starting the application to be started.

Preferably, performing a screen unlocking operation if the sliding operation with respect to the icon of the application to be started satisfies a second predetermined condition includes:

detecting whether the sliding distance of the icon of the application to be started in the predetermined direction is greater than a second predetermined threshold, in which the second predetermined threshold is greater than the first predetermined threshold; and if yes, performing the screen unlocking operation.

Preferably, providing memory resources for starting the application to be started includes:

obtaining a size of memory required by starting the application to be started;

determining whether remaining memory resources satisfy a memory requirement of starting the application to be started; and if no, releasing memory resources directly or according to a predetermined trigger condition, so as to satisfy the memory requirement of starting the application to be started.

Preferably, releasing memory resources according to a predetermined trigger condition includes:

releasing memory resources if the sliding distance of the icon of the application to be started in the predetermined direction is greater than a third predetermined threshold, in which the third predetermined threshold is greater than or equal to the first threshold and less than the second threshold.

Preferably, obtaining a size of memory required by starting the application to be started includes:

searching for the size of memory required by starting the application to be started in a preset memory requirement list stored locally; or sending a memory searching request to a server, and obtaining the size of memory required by starting the application to be started from the server, in which the memory searching request carries an identification of the application to be started.

Preferably, the memory searching request further carries hardware information of the electronic device, and the server determines the size of memory required by starting the application to be started according to the identification of the application to be started and the hardware information of the electronic device carried in the memory searching request.

Preferably, releasing memory resources includes:

releasing memory resources occupied by processes in the electronic device in sequence until the memory requirement of starting the application to be started is satisfied, in which memory resources occupied by a first kind of processes are released first, and memory resources occupied by a second kind of processes are released later, the first kind of processes are processes which will not be restarted by an operating system after exiting, and the second kind of processes are processes which will be restarted by the operating system after exiting.

Preferably, during releasing memory resources occupied by the first kind of processes, the memory resources occupied by respective processes are released in an order long to short of unused time of respective processes.

Preferably, during releasing memory resources occupied by the second kind of processes, the memory resources occupied by respective processes are released first in an order of long to short unused time of respective processes, and then in an order of long to short restarting periods of the respective processes.

Preferably, releasing memory resources includes:

determining a process having been started in the electronic device;

judging whether the processes having been started is included in a predetermined process list; and if no, releasing memory resources occupied by the process.

The present disclosure provides an electronic device for starting an application under a screen lock state. The electronic device, includes: a housing, a displayer, a circuit board and a processor, wherein the circuit board is arranged inside a space enclosed by the housing, the displayer is arranged external to the housing and connected with the circuit board, and the processor is arranged on the circuit board and configured to process data so as to execute following acts of:

detecting whether the electronic device is under the screen lock state;

receiving a sliding operation instruction with respect to an icon of the application to be started;

providing memory resources for starting the application to be started, if a sliding operation with respect to the icon of the application to be started satisfies a first predetermined condition;

performing a screen unlocking operation and starting the application to be started, if the sliding operation with respect to the icon of the application to be started satisfies a second predetermined condition.

The present disclosure provides a non-transitory computer-readable storage medium having stored therein instructions that, when executed by a processor of a device, causes the device to perform a method for starting an application under a screen lock state including:

detecting whether the electronic device is under the screen lock state;

receiving a sliding operation instruction with respect to an icon of the application to be started;

providing memory resources for starting the application to be started, if a sliding operation with respect to the icon of the application to be started satisfies a first predetermined condition;

performing a screen unlocking operation and starting the application to be started, if the sliding operation with respect to the icon of the application to be started satisfies a second predetermined condition. It can be seen from the above technical solutions that, in the present disclosure, under the screen lock state, the application to be started is started when it is detected that the sliding operation with respect to the icon of the application to be started satisfies the second predetermined condition. Compared with the related art, in the present disclosure, the application to be started may be selected and the application may be started by sliding the icon of the application to be started, without the need of unlocking the screen first. Thus, it is convenient for the user to start the application under the screen lock state. Meanwhile, when the sliding operation with respect to the icon of the application to be started satisfies the first predetermined condition, the memory resources required by starting the application to be started are provided during sliding the icon of the application to be started, without the need of obtaining the memory resources after beginning to start the application, thus enhancing the efficiency of starting the application and improving the experience effect of the user.

Embodiments of the present disclosure also provide a computer-readable storage medium, including computer instructions that, when executed, causes to perform the method for starting an application under a screen lock state according to embodiments of the present disclosure.

BRIEF DESCRIPTION OF THE DRAWINGS

In order to explicitly illustrate embodiments of the present disclosure or technical solutions in the related art, a brief introduction for the accompanying drawings used when describing the embodiments or the related art will be listed as follows. Apparently, the drawings described below are only corresponding to some embodiments of the present disclosure, and those skilled in the art may obtain other drawings according to these drawings without creative labor.

DETAILED DESCRIPTION

In the following, a method for starting an application under a screen lock state provided by embodiments of the present disclosure will be illustrated first, and the method may include following steps:

detecting whether it is under the screen lock state;

receiving a sliding operation instruction with respect to an icon of the application to be started;

providing memory resources for starting the application to be started, if a sliding operation with respect to the icon of the application to be started satisfies a first predetermined condition;

performing a screen unlocking operation and starting the application to be started, if the sliding operation with respect to the icon of the application to be started satisfies a second predetermined condition.

The executing subject of the above steps is an electronic device having a touch screen. Specifically, refer to FIG. 1 which is a schematic diagram illustrating sliding an icon of an application to be started according to an embodiment of the present disclosure, during sliding the icon of the application to be started, location 1 is an original location of the icon. If the icon is slid to location 2 at a certain time and it detects that the sliding operation from location 1 to location 2 satisfies the first predetermined condition, then it may further judge whether the memory resources in the electronic device satisfy the memory requirement of starting the application to be started, and provide corresponding memory resources for the application to be started. If the icon is slid further from location 2 and slid to location 3 at a certain time, then the screen unlocking operation is performed when it detects that the sliding operation from location 2 to location 3 satisfies the second predetermined condition, and the application to be started is started after unlocking.

In the following, technical solutions in embodiments of the present disclosure will be described clearly and completely with reference to drawings in the embodiments. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

Figure 2:
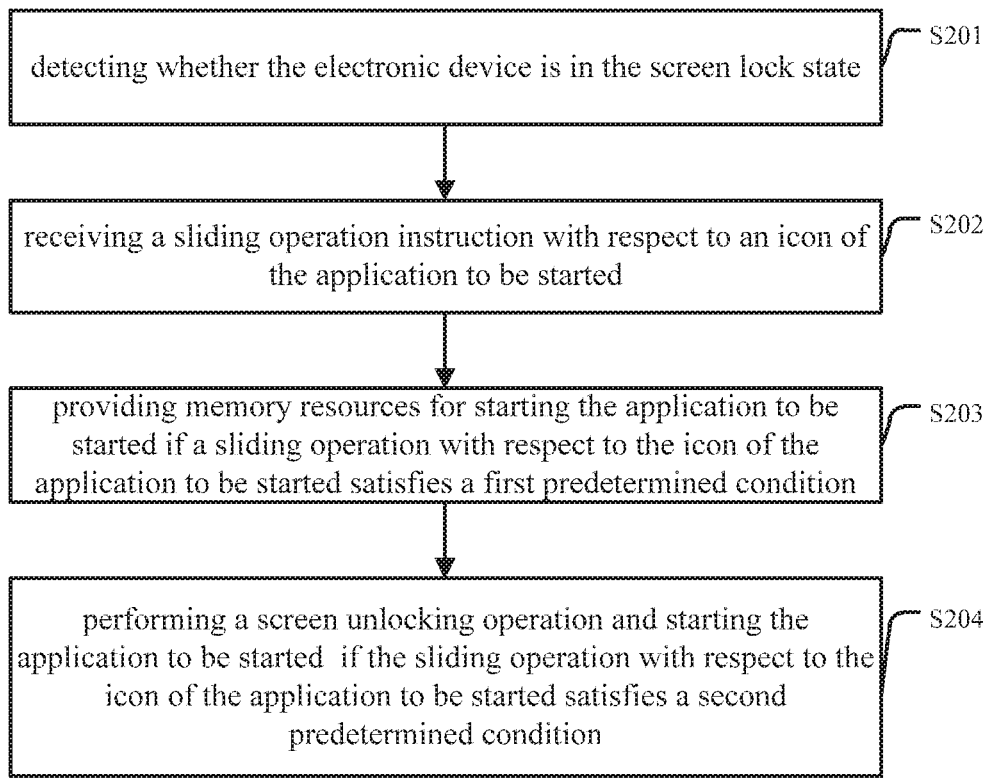
FIG. 2 is a flow chart of a method for starting an application under a screen lock state according to an embodiment of the present disclosure.

FIG. 2 is a flow chart of a method for starting an application under a screen lock state according to an embodiment of the present disclosure, and the method includes following steps.

In step 201, it is detected whether the electronic device is under the screen lock state.

In step 202, a sliding operation instruction with respect to an icon of the application to be started is received.

When the user selects the icon of a certain application on the touch screen and drags the icon for sliding, the electronic device may obtain a sliding signal via a signal collecting device of the touch screen.

In step 203, memory resources are provided for starting the application to be started, when a sliding operation with respect to the icon of the application to be started satisfies a first predetermined condition.

In this step, the sliding operation with respect to the icon of the application to be started may satisfy the first predetermined condition when a linear or curve sliding distance of the icon of the application to be started is greater than a predetermined value, or when a sliding route of the icon of the application to be started is consistent with a predetermined graph.

In a specific embodiment of the present disclosure, this step may include: detecting whether a sliding distance of the icon of the application to be started in a predetermined direction is greater than a first predetermined threshold, and if yes, providing memory resources for starting the application to be started.

The sliding distance refers to a distance between the original location of the icon of the application to be started and the location of the icon at a certain time during sliding.

The user may preset the direction of sliding the icon of the application to be started, in which an angle between the predetermined direction and the horizontal direction may be any value in a range of [0, 360].

It should be noted that, the icon of the application to be started may be slid along a straight line or a curved line in the predetermined direction, which is not limited in the present disclosure.

In addition, the first predetermined threshold may be a fixed value, for example, 1 cm, 2 cm, etc. Alternatively, the first predetermined threshold may be a percent of a width or height of the touch screen of the electronic device, for example, twenty percent of the width of the touch screen, thirty percent of the height of the touch screen, etc.

In practical use, multiple applications may run simultaneously in the electronic device, and each application may require some memory resources for running. Thus, during starting the application to be started, there may be a case in that the remaining memory resources can not satisfy the memory requirement of starting the application to be started. In this case, the system needs to release memory resources, so as to provide sufficient memory resources for starting the application to be started.

In this embodiment, when the sliding distance of the icon of the application to be started is greater than the first predetermined threshold, it considers that the user is more likely to start the application, and then it may judge first whether the remaining memory resources satisfy the memory requirement of starting the application to be started and provide memory resources for starting the application to be started, so as to avoid affecting the efficiency of starting the application if the memory releasing operation is performed after detecting that the memory resources are insufficient during starting the application. If it is judged that the remaining memory resources cannot satisfy the memory requirement of starting the application to be started, memory resources are released, and if it is judged that the remaining memory resources can satisfy the memory requirement of starting the application to be started, there is no need to release memory resources.

In step 204, a screen unlocking operation is performed and the application to be started is started, if the sliding operation with respect to the icon of the application to be started satisfies a second predetermined condition.

In this step, the sliding operation with respect to the icon of the application to be started may be determined as satisfying the second predetermined condition in a similar case when the sliding operation with respect to the icon of the application to be started satisfies the first predetermined condition, which will be elaborated herein.

In a specific embodiment of the present disclosure, this step may include: detecting whether the sliding distance of the icon of the application to be started in the predetermined direction is greater than a second predetermined threshold, and if yes, performing the screen unlocking operation and starting the application to be started.

The second predetermined threshold is greater than the first predetermined threshold.

Specifically, when the system detects that the screen unlocking operation is completed, it calls the operation of starting the application to be started, without the need of manually starting the application to be started by the user.

It can be seen from the above technical solutions that, in the present disclosure, under the screen lock state, the application to be started is started when it is detected that the sliding operation with respect to the icon of the application to be started satisfies the second predetermined condition. Compared with the related art, in the present disclosure, the application to be started may be selected and the application may be started by sliding the icon of the application to be started, without the need of unlocking the screen first. Thus, it is convenient for the user to start the application under the screen lock state. Meanwhile, when the sliding operation with respect to the icon of the application to be started satisfies the first predetermined condition, the memory resources required by starting the application to be started are provided during sliding the icon of the application to be started, without the need of obtaining the memory resources after beginning to start the application, thus enhancing the efficiency of starting the application and improving the experience effect of the user.

Figure 3:
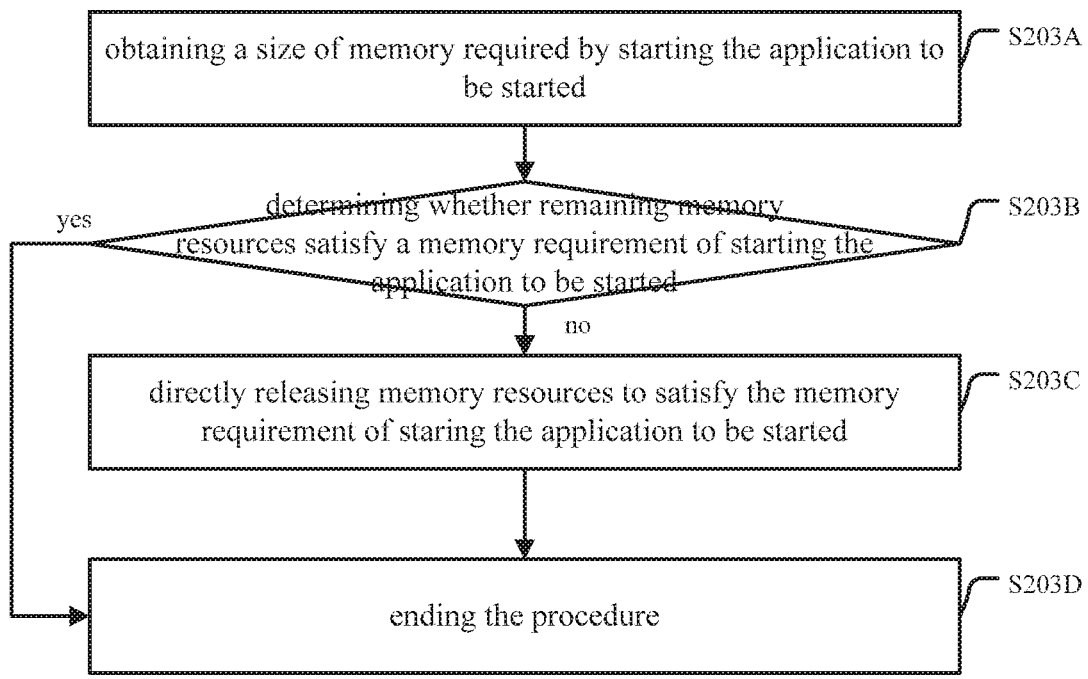
FIG. 3 is a flow chart of a method of providing memory resources for an application to be started according to an embodiment of the present disclosure.

In another embodiment of the present disclosure, a specific implementation of providing memory resources for the application to be started (step 203 in the embodiment shown in FIG. 2) is provided. Refer to FIG. 3 which is a flow chart of a method of providing memory resources for an application to be started according to an embodiment of the present disclosure, the method may include following steps.

In step 203A, a size of memory required by starting the application to be started is obtained.

In a specific embodiment of the present disclosure, the size of memory required by starting the application to be started may be obtained from the server by sending a memory searching request to the server.

The memory searching request needs to carry an identification of the application to be started, and then the server determines the size of memory required by starting the application to be started according to the identification of the application to be started. In addition, the memory searching request may further carry hardware information of the electronic device, and then the server can determine the size of memory required by starting the application to be started according to the identification of the application to be started and the hardware information of the electronic device carried in the memory searching request. The hardware information of the electronic device may be information such as a size of the screen. When the screen of the electronic device is large, more memory resources are required by starting the application to be started, while when the screen of the electronic device is small, less memory resources are required by starting the application to be started.

It should be noted that, the information carried in the memory searching request is not limited in the present disclosure, and can be set according to particular situations in practical use.

In another specific embodiment of the present disclosure, the size of memory required by starting the application to be started may be obtained by searching a preset memory requirement list stored locally.

The preset memory requirement list may be obtained from the server and stored locally, and may be a list including memory requirements of multiple applications. In this case, the size of memory required by starting the application to be started may be obtained from the preset memory requirement list according to the identification of the application to be started.

The preset memory requirement list may also be a memory requirement list generated locally with respect to the electronic device and according to characteristics of the user. In this case, when the user starts the application to be started for the first time, it needs to obtain the size of memory required by starting the application to be started from the server by sending the memory searching request to the server, and to update the memory requirement list according to the obtained memory requirement information. When the user starts the application to be started again, the corresponding information may be obtained directly from the preset memory requirement list stored locally without the need of obtaining it from the server.

In step 203B, it is determined whether remaining memory resources satisfy the memory requirement of starting the application to be started, and if no, step 203C is executed, and if yes, step 203D is executed.

In practical use, except releasing memory resources directly, it is also possible to release memory resources according to a predetermined trigger condition.

Specifically, memory resources may be released if the sliding direction of the icon of the application to be started in the predetermined direction is greater than a third predetermined threshold.

The third predetermined threshold is greater than or equal to the first threshold and less than the second threshold, i.e. in a range of [the first threshold, the second threshold).

When releasing memory resources, memory resources occupied by respective processes in the electronic device are released in sequence until the memory requirement of starting the application to be started is satisfied. Specifically, the memory resources occupied by processes which will not be restarted by the operating system after exiting are released first, and then the memory resources occupied by processes which will be restarted by the operation system after exiting are released.

During releasing memory resources occupied by processes which will not be restarted by the operating system after exiting, the memory resources occupied by respective processes are released in an order of long to short unused time of respective processes.

During releasing memory resources occupied by processes which will be restarted by the operating system after exiting, the memory resources occupied by respective processes are released first in an order of long to short unused time of respective processes, and then in an order of long to short restarting periods of the respective processes. For example, if the restarting period of process A is 10 s and the restarting period of process B is 20 s, then the memory resources occupied by process B are released prior to process A.

It should be noted that, during releasing memory resources, if the memory requirement of starting the application to be started can be satisfied when memory resources occupied by only part of the processes are released according to priorities, then it only needs to release memory resources occupied by part of the processes.

In a specific embodiment of the present disclosure, the memory resources may be released in the following way:

determining a process having been started in the electronic device;

judging whether the process is included in a predetermined process list; and if no, releasing memory resources occupied by the process.

Specifically, when releasing memory resources, if it is judged that the process having been started is not included in the predetermined process list, then the memory resources occupied by this process are released, instead of releasing memory resources occupied by processes in the predetermined process list.

The memory resources occupied by processes not included in the predetermined process list may also be released according to priorities, for example, the size of memory resources occupied by processes, whether processes are restarted after exiting, unused time of processes, etc.

The above examples are only described for explanation, and in practical use, the priorities of processes may be determined according to particular situations.

In step 203D, the procedure is ended.

It can been seen from above that, in the present disclosure, the memory resources occupied by respective processes are released in sequence according to their priorities until the memory requirement of starting the application to be started is satisfied, thus enhancing the efficiency of starting the application, and efficiently avoiding frequent restarting of some processes.

Figure 4:
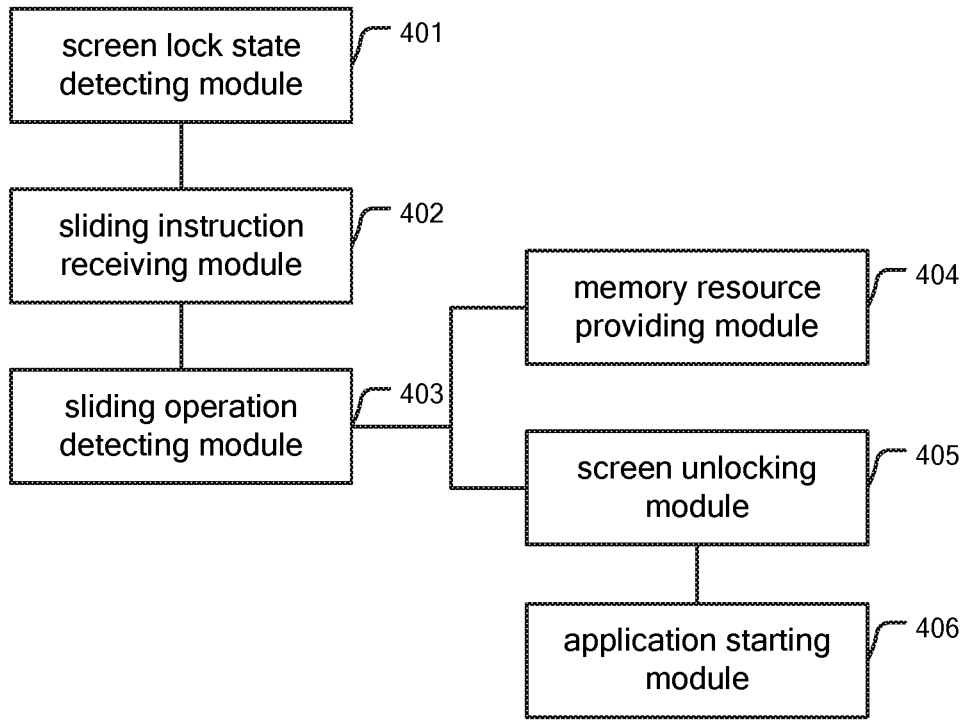
FIG. 4 is a first block diagram of a device for starting an application under a screen lock state according to an embodiment of the present disclosure.

FIG. 4 is a first block diagram of a device for starting an application under a screen lock state according to an embodiment of the present disclosure. The device is applied in an electronic device, and includes a screen lock state detecting module 401, a sliding instruction receiving module 402, a sliding operation detecting module 403, a memory resource providing module 404, a screen unlocking module 405 and an application starting module 406.

The screen lock state detecting module 401 is configured to detect whether the electronic device is under the screen lock state.

The sliding instruction receiving module 402 is configured to receive a sliding operation instruction with respect to an icon of the application to be started.

The sliding operation detecting module 403 is configured to detect a sliding operation with respect to the icon of the application to be started.

The memory resource providing module 404 is configured to provide memory resources for starting the application to be started, if the sliding operation detecting module 403 detects that the sliding operation with respect to the icon of the application to be started satisfies a first predetermined condition.

The screen unlocking module 405 is configured to perform a screen unlocking operation if the sliding operation detecting module 403 detects that the sliding operation with respect to the icon of the application to be started satisfies a second predetermined condition.

The application starting module 406 is configured to start the application to be started after the screen unlocking module 405 performs the screen unlocking operation.

In a specific embodiment of the present disclosure, the memory resource providing module 404 is configured to provide memory resources for starting the application to be started if the sliding operation detecting module 403 detects that a sliding distance of the icon of the application to be started in a predetermined direction is greater than a first predetermined threshold.

In another specific embodiment of the present disclosure, the screen unlocking module 405 is configured to perform the screen unlocking operation if the sliding operation detecting module 403 detects that the sliding distance of the icon of the application to be started in the predetermined direction is greater than a second predetermined threshold, in which the second predetermined threshold is greater than the first predetermined threshold.

It can been seen from above that, in the present disclosure, under the screen lock state, the application to be started is started when it is detected that the sliding operation with respect to the icon of the application to be started satisfies the second predetermined condition. Compared with the related art, in the present disclosure, the application to be started may be selected and the application may be started by sliding the icon of the application to be started, without the need of unlocking the screen first. Thus, it is convenient for the user to start the application under the screen lock state. Meanwhile, when the sliding operation with respect to the icon of the application to be started satisfies the first predetermined condition, the memory resources required by starting the application to be started are provided during sliding the icon of the application to be started, without the need of obtaining the memory resources after beginning to start the application, thus enhancing the efficiency of starting the application and improving the experience effect of the user.

Figure 5:
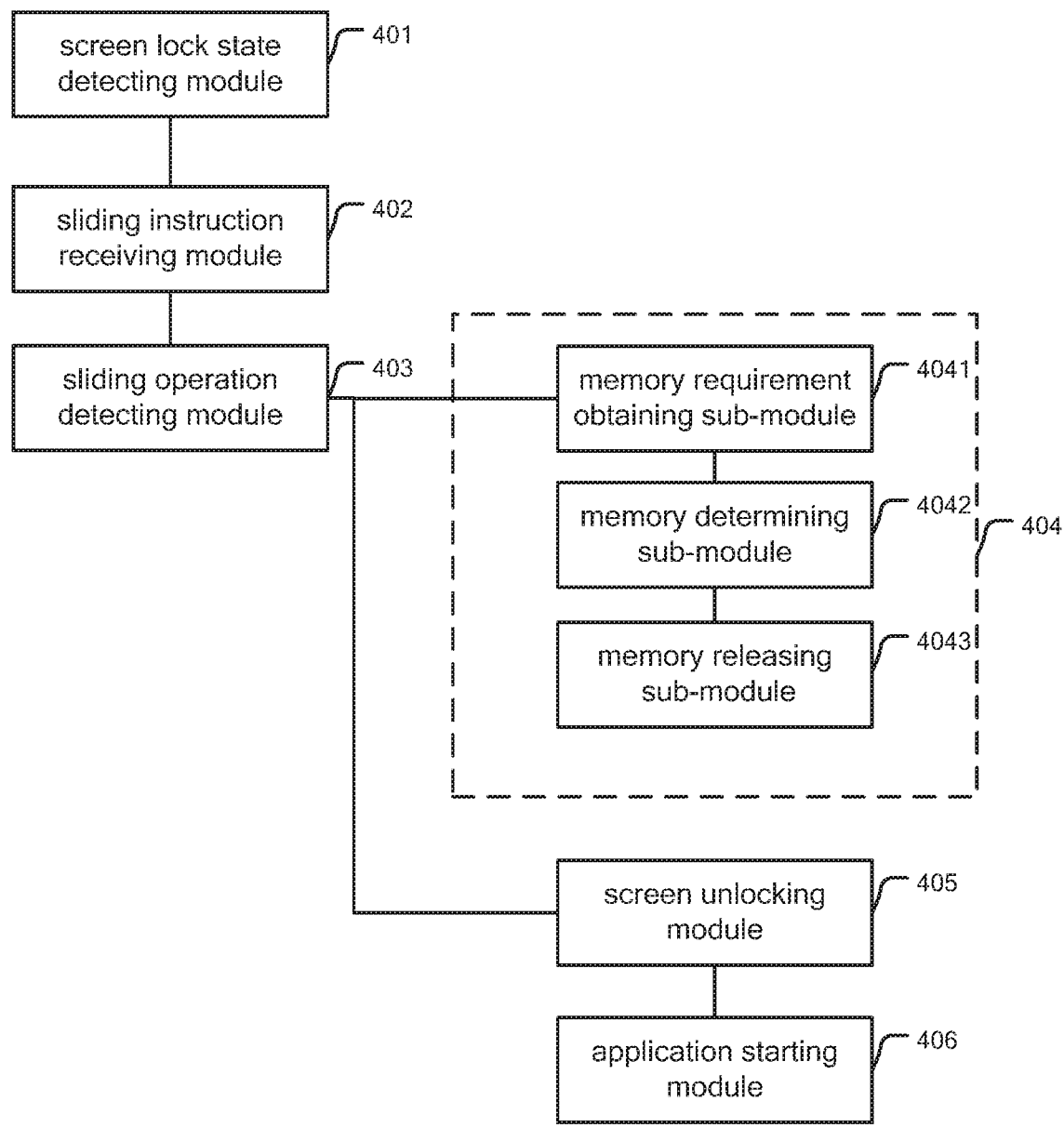
FIG. 5 is a second block diagram of a device for starting an application under a screen lock state according to an embodiment of the present disclosure.

In another embodiment of the present disclosure, a specific implementation of the memory resource providing module 404 in the embodiment shown in FIG. 4 is provided. Refer to FIG. 5 which is a second block diagram of a device for starting an application under a screen lock state according to an embodiment of the present disclosure, the memory resource providing module 404 may specifically include a memory requirement obtaining sub-module 4041, a memory determining sub-module 4042 and a memory releasing sub-module 4043.

The memory requirement obtaining sub-module 4041 is configured to obtain a size of memory required by starting the application to be started;

The memory determining sub-module 4042 is configured to determine whether remaining memory resources satisfy a memory requirement of starting the application to be started.

The memory releasing sub-module 4043 is configured to release memory resources directly or according to a predetermined trigger condition, if a determining result of the memory determining sub-module is no, so as to satisfy the memory requirement of starting the application to be started.

In a specific embodiment of the present disclosure, the memory releasing sub-module 4043 is configured to release memory resources if the sliding operation detecting module 403 detects that the sliding distance of the icon of the application to be started in the predetermined direction is greater than a third predetermined threshold, in which the third predetermined threshold is greater than or equal to the first threshold and less than the second threshold.

Specifically, the memory requirement obtaining sub-module 4041 is configured to search for the size of memory required by starting the application to be started in a preset memory requirement list stored locally, or configured to send a memory searching request to a server, and to obtain the size of memory required by starting the application to be started from the server, in which the memory searching request carries an identification of the application to be started.

In a specific embodiment of the present disclosure, the memory searching request sent by the memory requirement obtaining sub-module 4041 further carries hardware information of the electronic device, and the server determines the size of memory required by starting the application to be started according to the identification of the application to be started and the hardware information of the electronic device carried in the memory searching request.

Specifically, the memory releasing sub-module 4043 may include a first releasing unit and a second releasing unit (not shown).

The memory releasing sub-module 4043 is configured to release memory resources occupied by respective processes in the electronic device in sequence until the memory requirement of starting the application to be started is satisfied, in which the first releasing unit is triggered first and the second releasing unit is triggered later.

The first releasing unit is configured to release memory resources occupied by processes which will not be restarted by an operating system after exiting.

The second releasing unit is configured to release memory resources occupied by processes which will be restarted by the operating system after exiting.

In a specific embodiment of the present disclosure, the first releasing unit is configured to release the memory resources occupied by respective processes in an order of long to short unused time of respective processes, during releasing memory resources occupied by processes which will not be restarted by an operating system after exiting.

In another specific embodiment of the present disclosure, the second releasing unit is configured to release the memory resources occupied by respective resources first in an order of long to short unused time of respective processes, and then in an order of long to short restarting periods of the respective processes, during releasing memory resources occupied by processes which will be restarted by the operating system after exiting.

In another specific embodiment of the present disclosure, the memory releasing sub-module 4043 may include a started processes determining unit, a process identification judging unit, and a memory releasing unit (not shown).

The started processes determining unit is configured to determine a processes having been started in the electronic device.

The process identification judging unit is configured to judge whether the process having been started is included in a process list.

The memory releasing unit is configured to release memory resources occupied by the process if a judging result of the process identification judging unit is no.

It can be seen from above that, in the present disclosure, in the present disclosure, the memory resources occupied by respective processes are released in sequence according to their priorities until the memory requirement of starting the application to be started is satisfied, thus enhancing the efficiency of starting the application, and efficiently avoiding frequent restarting of some processes.

With respect to the device embodiments, since they are substantially similar to the method embodiments, they are described briefly, and for related content, please refer to the description of method embodiments.

The embodiments of the present disclosure also provide an electronic device for starting an application under a screen lock state. The electronic device for starting an application under a screen lock state includes a housing, a displayer, a circuit board and a processor, in which the circuit board is arranged inside a space enclosed by the housing, the displayer is arranged external to the housing and connected with the circuit board, and the processor is arranged on the circuit board and configured to process data so as to execute following steps:

detecting whether it is under the screen lock state;

receiving a sliding operation instruction with respect to an icon of the application to be started;

providing memory resources for starting the application to be started, if a sliding operation with respect to the icon of the application to be started satisfies a first predetermined condition;

performing a screen unlocking operation and starting the application to be started, if the sliding operation with respect to the icon of the application to be started satisfies a second predetermined condition.

Figure 1:
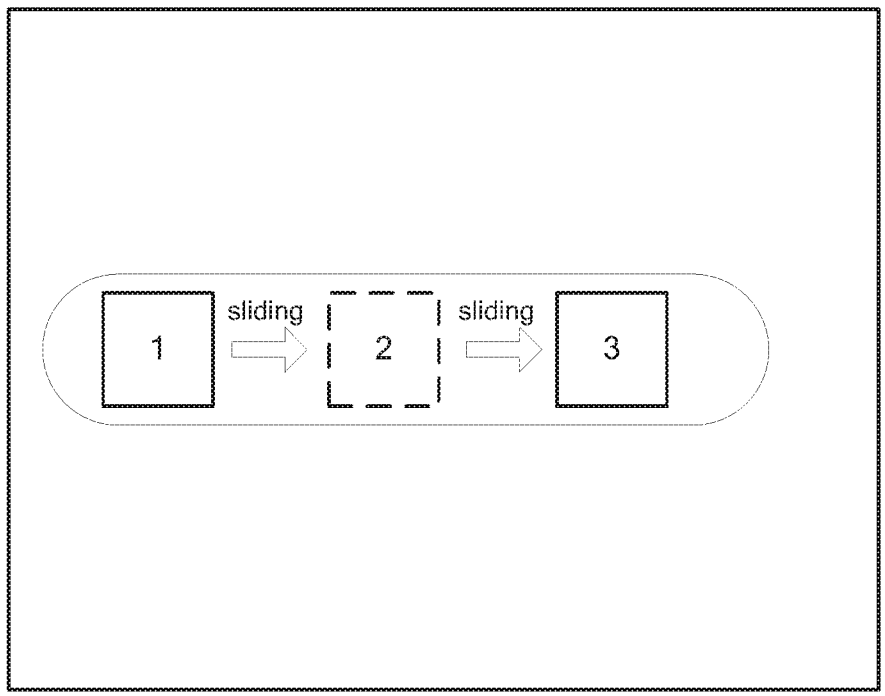
FIG. 1 is a schematic diagram illustrating sliding an icon of an application to be started according to an embodiment of the present disclosure.

Refer to FIG. 1 which is a schematic diagram illustrating sliding an icon of an application to be started according to an embodiment of the present disclosure, during sliding the icon of the application to be started, location 1 is an original location of the icon. If the icon is slid to location 2 at a certain time and it detects that the sliding operation from location 1 to location 2 satisfies the first predetermined condition, then the processor may further judge whether the memory resources in the electronic device satisfy the memory requirement of starting the application to be started, and provide corresponding memory resources for the application to be started. If the icon is slid further from location 2 and slid to location 3 at a certain time, then the screen unlocking operation is performed when it detects that the sliding operation from location 2 to location 3 satisfies the second predetermined condition, and the application to be started is started after unlocking.

In the following, the processor is configured to execute following steps.

In step 201', it is detected whether the electronic device is under the screen lock state.

In step 202', a sliding operation instruction with respect to an icon of the application to be started is received.

When the user selects the icon of a certain application on the touch screen and drags the icon for sliding, the processor may obtain a sliding signal via a signal collecting device of the touch screen.

In step 203', memory resources are provided for starting the application to be started, when a sliding operation with respect to the icon of the application to be started satisfies a first predetermined condition.

In this step, the sliding operation with respect to the icon of the application to be started may satisfy the first predetermined condition when a linear or curve sliding distance of the icon of the application to be started is greater than a predetermined value, or when a sliding route of the icon of the application to be started is consistent with a predetermined graph.

In a specific embodiment of the present disclosure, this step may include: detecting whether a sliding distance of the icon of the application to be started in a predetermined direction is greater than a first predetermined threshold, and if yes, providing memory resources for starting the application to be started.

The sliding distance refers to a distance between the original location of the icon of the application to be started and the location of the icon at a certain time during sliding.

The user may preset the direction of sliding the icon of the application to be started, in which an angle between the predetermined direction and the horizontal direction may be any value in a range of [0, 360].

It should be noted that, the icon of the application to be started may be slid along a straight line or a curved line in the predetermined direction, which is not limited in the present disclosure.

In addition, the first predetermined threshold may be a fixed value, for example, 1 cm, 2 cm, etc. Alternatively, the first predetermined threshold may be a percent of a width or height of the touch screen of the electronic device, for example, twenty percent of the width of the touch screen, thirty percent of the height of the touch screen, etc.

In practical use, multiple applications may run simultaneously in the electronic device, and each application may require some memory resources for running. Thus, during starting the application to be started, there may be a case in that the remaining memory resources can not satisfy the memory requirement of starting the application to be started. In this case, the system needs to release memory resources, so as to provide sufficient memory resources for starting the application to be started.

In this embodiment, when the sliding distance of the icon of the application to be started is greater than the first predetermined threshold, it considers that the user is more likely to start the application, and then it may judge first whether the remaining memory resources satisfy the memory requirement of starting the application to be started and provide memory resources for starting the application to be started, so as to avoid affecting the efficiency of starting the application if the memory releasing operation is performed after detecting that the memory resources are insufficient during starting the application. If it is judged that the remaining memory resources cannot satisfy the memory requirement of starting the application to be started, memory resources are released, and if it is judged that the remaining memory resources can satisfy the memory requirement of starting the application to be started, there is no need to release memory resources.

In step 204', a screen unlocking operation is performed and the application to be started is started, if the sliding operation with respect to the icon of the application to be started satisfies a second predetermined condition.

In this step, the sliding operation with respect to the icon of the application to be started may be determined as satisfying the second predetermined condition in a similar case when the sliding operation with respect to the icon of the application to be started satisfies the first predetermined condition, which will be elaborated herein.

In a specific embodiment of the present disclosure, this step may include: detecting whether the sliding distance of the icon of the application to be started in the predetermined direction is greater than a second predetermined threshold, and if yes, performing the screen unlocking operation and starting the application to be started.

The second predetermined threshold is greater than the first predetermined threshold.

Specifically, when the system detects that the screen unlocking operation is completed, it calls the operation of starting the application to be started, without the need of manually starting the application to be started by the user.

It can be seen from the above technical solutions that, in the present disclosure, under the screen lock state, the application to be started is started when it is detected that the sliding operation with respect to the icon of the application to be started satisfies the second predetermined condition. Compared with the related art, in the present disclosure, the application to be started may be selected and the application may be started by sliding the icon of the application to be started, without the need of unlocking the screen first. Thus, it is convenient for the user to start the application under the screen lock state. Meanwhile, when the sliding operation with respect to the icon of the application to be started satisfies the first predetermined condition, the memory resources required by starting the application to be started are provided during sliding the icon of the application to be started, without the need of obtaining the memory resources after beginning to start the application, thus enhancing the efficiency of starting the application and improving the experience effect of the user.

In another embodiment of the present disclosure, the processor is further configured to execute following steps.

In step 203A', a size of memory required by starting the application to be started is obtained.

In a specific embodiment of the present disclosure, the size of memory required by starting the application to be started may be obtained from the server by sending a memory searching request to the server.

The memory searching request needs to carry an identification of the application to be started, and then the server determines the size of memory required by starting the application to be started according to the identification of the application to be started.

In addition, the memory searching request may further carry hardware information of the electronic device, and then the server can determine the size of memory required by starting the application to be started according to the identification of the application to be started and the hardware information of the electronic device carried in the memory searching request. The hardware information of the electronic device may be information such as a size of the screen. When the screen of the electronic device is large, more memory resources are required by starting the application to be started, while when the screen of the electronic device is small, less memory resources are required by starting the application to be started.

It should be noted that, the information carried in the memory searching request is not limited in the present disclosure, and can be set according to particular situations in practical use.

In another specific embodiment of the present disclosure, the size of memory required by starting the application to be started may be obtained by searching a preset memory requirement list stored locally.

The preset memory requirement list may be obtained from the server and stored locally, and may be a list including memory requirements of multiple applications. In this case, the size of memory required by starting the application to be started may be obtained from the preset memory requirement list according to the identification of the application to be started.

The preset memory requirement list may also be a memory requirement list generated locally with respect to the electronic device and according to characteristics of the user. In this case, when the user starts the application to be started for the first time, it needs to obtain the size of memory required by starting the application to be started from the server by sending the memory searching request to the server, and to update the memory requirement list according to the obtained memory requirement information. When the user starts the application to be started again, the corresponding information may be obtained directly from the preset memory requirement list stored locally without the need of obtaining it from the server.

In step 203B', it is determined whether remaining memory resources satisfy the memory requirement of starting the application to be started, and if no, step 203C' is executed, and if yes, step 203D' is executed.

In step 203C', memory resources are released directly.

In practical use, except releasing memory resources directly, it is also possible to release memory resources according to a predetermined trigger condition.

Specifically, memory resources may be released if the sliding direction of the icon of the application to be started in the predetermined direction is greater than a third predetermined threshold.

The third predetermined threshold is greater than or equal to the first threshold and less than the second threshold, i.e. in a range of [the first threshold, the second threshold).

When releasing memory resources, memory resources occupied by respective processes are released in sequence until the memory requirement of starting the application to be started is satisfied. Specifically, the memory resources occupied by processes which will not be restarted by the operating system after exiting are released first, and then the memory resources occupied by processes which will be restarted by the operation system after exiting are released.

During releasing memory resources occupied by processes which will not be restarted by the operating system after exiting, the memory resources occupied by respective processes are released in an order of long to short unused time of respective processes.

During releasing memory resources occupied by processes which will be restarted by the operating system after exiting, the memory resources occupied by respective processes are released first in an order of long to short unused time of respective processes, and then in an order of long to short restarting periods of the respective processes. For example, if the restarting period of process A is 10 s and the restarting period of process B is 20 s, then the memory resources occupied by process B are released prior to process A.

It should be noted that, during releasing memory resources, if the memory requirement of starting the application to be started can be satisfied when memory resources occupied by only part of the processes are released according to priorities, then it only needs to release memory resources occupied by part of the processes.

In a specific embodiment of the present disclosure, the processor is further configured to release the memory resources by following way:

determining a process having been started in the electronic device;

judging whether the process is included in a predetermined process list; and if no, releasing memory resources occupied by the process.

Specifically, when releasing memory resources, if it is judged that the process having been started is not included in the predetermined process list, then the memory resources occupied by this process are released, instead of releasing memory resources occupied by processes in the predetermined process list.

The memory resources occupied by processes not included in the predetermined process list may also be released according to priorities, for example, the size of memory resources occupied by processes, whether processes are restarted after exiting, unused time of processes, etc.

The above examples are only described for explanation, and in practical use, the priorities of processes may be determined according to particular situations.

In step 203D', the procedure is ended.

It can been seen from above that, in the present disclosure, the memory resources occupied by respective processes are released in sequence according to their priorities until the memory requirement of starting the application to be started is satisfied, thus enhancing the efficiency of starting the application, and efficiently avoiding frequent restarting of some processes.

Embodiments of the present disclosure also provide a non-transitory computer-readable storage medium for storing computer instructions that, when executed, causes to perform the method for starting an application under a screen lock state according to embodiments of the present disclosure.

It should be noted that, in the present disclosure, relational terms such as first and second are only used distinguish one entity or operation from another entity or operation, but do not require or imply any actual relation or order between these entities or operations. Moreover, terms such as "including", "comprising" or any other variants are intended to cover non-exclusive containing, such that the process, method, product or apparatus including a series of elements does not only include those items, but also include other elements which are not listed explicitly, or also include elements inherently included in the process, method, product or apparatus. Without more limitations, the element defined by a phase of "including a/an . . . " does not exclude that the process, method, product or apparatus including the element includes other equivalent elements.

It should be understood for those skilled in the art that, all or part of steps implementing the above method embodiments can be realized by programs to instruct related hardware. The programs can be stored in a computer-readable storage medium, and the storage medium herein is ROM/RAM, disk, CD, etc.

The above description is only preferred embodiments of the present disclosure and is not used to limit the present disclosure. Any modification, alternative or improvement made within the spirit and principle of the present disclosure falls in the protection scope of the present disclosure.

What is claimed is:

1. A method for starting an application under a screen lock state, wherein the method is applied in an electronic device and the method comprises:

detecting whether the electronic device is under the screen lock state;

receiving a sliding operation instruction with respect to an icon of the application to be started;

providing memory resources for starting the application to be started in response to detecting that a sliding distance of the icon of the application to be started in a predetermined direction is greater than a first predetermined threshold;

releasing memory resources (1) in response to detecting that the sliding distance of the icon of the application to be started in the predetermined direction is greater than a third predetermined threshold, in which the third predetermined threshold is greater than the first predetermined threshold and less than a second predetermined threshold, and (2) in response to detecting that remaining memory resources do not satisfy a memory requirement of starting the application to be started; and, performing a screen unlocking operation and starting the application to be started in response to detecting that the sliding distance of the icon of the application to be started in the predetermined direction is greater than the second predetermined threshold, in which the second predetermined threshold is greater than the first predetermined threshold.

2. The method according to claim 1, wherein providing memory resources for starting the application to be started comprises:

obtaining a size of memory required by starting the application to be started; and, releasing the memory resources directly or according to a predetermined trigger condition, so as to satisfy the memory requirement of starting the application to be started.

3. The method according to claim 2, wherein obtaining a size of memory required by starting the application to be started comprises:

searching for the size of memory required by starting the application to be started in a preset memory requirement list stored locally; or sending a memory searching request to a server, and obtaining the size of memory required by starting the application to be started from the server, in which the memory searching request carries an identification of the application to be started, wherein the memory searching request further carries hardware information of the electronic device, and the server determines the size of memory required by starting the application to be started according to the identification of the application to be started and the hardware information of the electronic device carried in the memory searching request.

4. The method according to claim 2, wherein releasing memory resources comprises:

releasing memory resources occupied by processes in the electronic device in sequence until the memory requirement of starting the application to be started is satisfied, in which memory resources occupied by a first kind of processes are released first, and memory resources occupied by a second kind of processes are released later, the first kind of processes are processes which will not be restarted by an operating system after exiting, and the second kind of processes are processes which will be restarted by the operating system after exiting.

5. The method according to claim 4, wherein during releasing memory resources occupied by the first kind of processes, the memory resources occupied by respective processes are released in an order of long to short unused time of respective processes.

6. The method according to claim 4, wherein during releasing memory resources occupied by the second kind of processes, the memory resources occupied by respective processes are released first in an order of long to short unused time of respective processes, and then in an order of long to short starting periods of the respective processes.

7. The method according to claim 2, wherein releasing memory resources comprises:
   determining a process having been started in the electronic device; and
   releasing memory resources occupied by the process having been started in the electronic device in response to judging that the process having been started is not included in a predetermined process list.

8. A non-transitory computer-readable storage medium, comprising computer instructions that, when executed, causes to perform the method for starting an application under a screen lock state, in which the method comprises:
   detecting whether the electronic device is under the screen lock state;
   receiving a sliding operation instruction with respect to an icon of the application to be started;
   providing memory resources for starting the application to be started in response to detecting that a sliding distance of the icon of the application to be started in a predetermined direction is greater than a first predetermined threshold;
   releasing memory resources (1) in response to detecting that the sliding distance of the icon of the application to be started in the predetermined direction is greater than a third predetermined threshold, in which the third predetermined threshold is greater than the first predetermined threshold and less than a second predetermined threshold, and (2) in response to detecting remaining memory resources do not satisfy a memory requirement of starting the application to be started; and,
   performing a screen unlocking operation and starting the application to be started in response to detecting that the sliding distance of the icon of the application to be started in the predetermined direction is greater than the second predetermined threshold, in which the second predetermined threshold is greater than the first predetermined threshold.

9. An electronic device for starting an application under a screen lock state, comprising: a housing, a displayer, a circuit board and a processor, wherein the circuit board is arranged inside a space enclosed by the housing, the displayer is arranged external to the housing and connected with the circuit board, and the processor is arranged on the circuit board and configured to process data so as to execute following acts of:
   detecting whether the electronic device is under the screen lock state;
   receiving a sliding operation instruction with respect to an icon of the application to be started;
   providing memory resources for starting the application to be started in response to detecting that a sliding distance of the icon of the application to be started in a predetermined direction is greater than a first predetermined threshold;
   releasing memory resources (1) in response to detecting that the sliding distance of the icon of the application to be started in the predetermined direction is greater than a third predetermined threshold, in which the third predetermined threshold is greater than the first predetermined threshold and less than a second predetermined threshold, and (2) in response to detecting remaining memory resources do not satisfy a memory requirement of starting the application to be started; and,
   performing a screen unlocking operation and starting the application to be started in response to detecting that the sliding distance of the icon of the application to be started in the predetermined direction is greater than the second predetermined threshold, in which the second predetermined threshold is greater than the first predetermined threshold.

10. The electronic device according to claim 9, wherein the processor is further configured to execute following acts of:
   obtaining a size of memory required by starting the application to be started; and,
   releasing memory resources directly or according to a predetermined trigger condition, so as to satisfy the memory requirement of starting the application to be started.

11. The electronic device according to claim 10, wherein the processor is configured to obtain a size of memory required by starting the application to be started by following acts of:
   searching for the size of memory required by starting the application to be started in a preset memory requirement list stored locally; or
   sending a memory searching request to a server, and obtaining the size of memory required by starting the application to be started from the server, in which the memory searching request carries an identification of the application to be started,
   wherein the memory searching request further carries hardware information of the electronic device, and the server determines the size of memory required by starting the application to be started according to the identification of the application to be started and the hardware information of the electronic device carried in the memory searching request.

12. The electronic device according to claim 10, wherein the processor is configured to release memory resources by following acts of:
   releasing memory resources occupied by processes in the electronic device in sequence until the memory requirement of starting the application to be started is satisfied, in which memory resources occupied by a first kind of processes are released first, and memory resources occupied by a second kind of processes are released later, the first kind of processes are processes which will not be restarted by an operating system after exiting, and the second kind of processes are processes which will be restarted by the operating system after exiting.

13. The electronic device according to claim 12, wherein during releasing memory resources occupied by the first kind of processes, the memory resources occupied by respective processes are released in an order of long to short unused time of respective processes; and/or during releasing memory resources occupied by the second kind of processes, the memory resources occupied by respective processes are released first in an order of long to short unused time of respective processes, and then of long to short starting periods of the respective processes.

14. The electronic device according to claim 10, wherein the processor is configured to release memory resources by following acts of:

determining a process having been started in the electronic device; and releasing memory resources occupied by the process having been started in response to judging that the process having been started is not included in a predetermined process list.

* * * * *